(12) United States Patent
Mittelstadt et al.

(10) Patent No.: US 6,389,280 B1
(45) Date of Patent: May 14, 2002

(54) MOBILE TELEPHONE CONFIGURATION IN RESPONSE TO A MENU TIME-OUT

(75) Inventors: David J. Mittelstadt; Shawn C. Morrison; Gayathri Chittiappa; Jon D. Slater, all of Boulder; Steve C. DeTar, Longmont, all of CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/393,045

(22) Filed: Sep. 9, 1999

(51) Int. Cl.[7] .............................. H04M 3/00; G06F 3/00
(52) U.S. Cl. ...................... 455/418; 455/566; 345/146; 345/352
(58) Field of Search ................................. 455/418, 575, 455/574, 566, 550; 345/352, 146, 33, 145

(56) References Cited

U.S. PATENT DOCUMENTS

| 5,363,481 A | 11/1994 | Tilt |
| 5,465,401 A | 11/1995 | Thompson |
| 5,579,535 A | 11/1996 | Orlen et al. |
| 5,596,348 A | * 1/1997 | Hayakawa ................... 345/146 |
| 5,761,610 A | 6/1998 | Sorensen et al. |
| 5,892,475 A | * 4/1999 | Palatsi ......................... 345/352 |
| 5,915,214 A | * 6/1999 | Reece et al. ................. 455/406 |

FOREIGN PATENT DOCUMENTS

EP 0817448 6/1996

OTHER PUBLICATIONS

NOKIA, Nokia 6160 Owner's Manual, Nokia Mobile Phones, Inc. (Canada).

\* cited by examiner

*Primary Examiner*—Edward F. Urban
*Assistant Examiner*—Erika A. Gary
(74) *Attorney, Agent, or Firm*—Philip R. Wadsworth; Gregory D. Ogrod

(57) ABSTRACT

A mobile telephone has an existing configuration and displays a menu. The mobile telephone generates a time-out from the menu if an elapsed time after entering the menu exceeds a time period. In response to the time-out, the mobile telephone implements a new configuration based on the menu in which the time-out occurred.

12 Claims, 7 Drawing Sheets

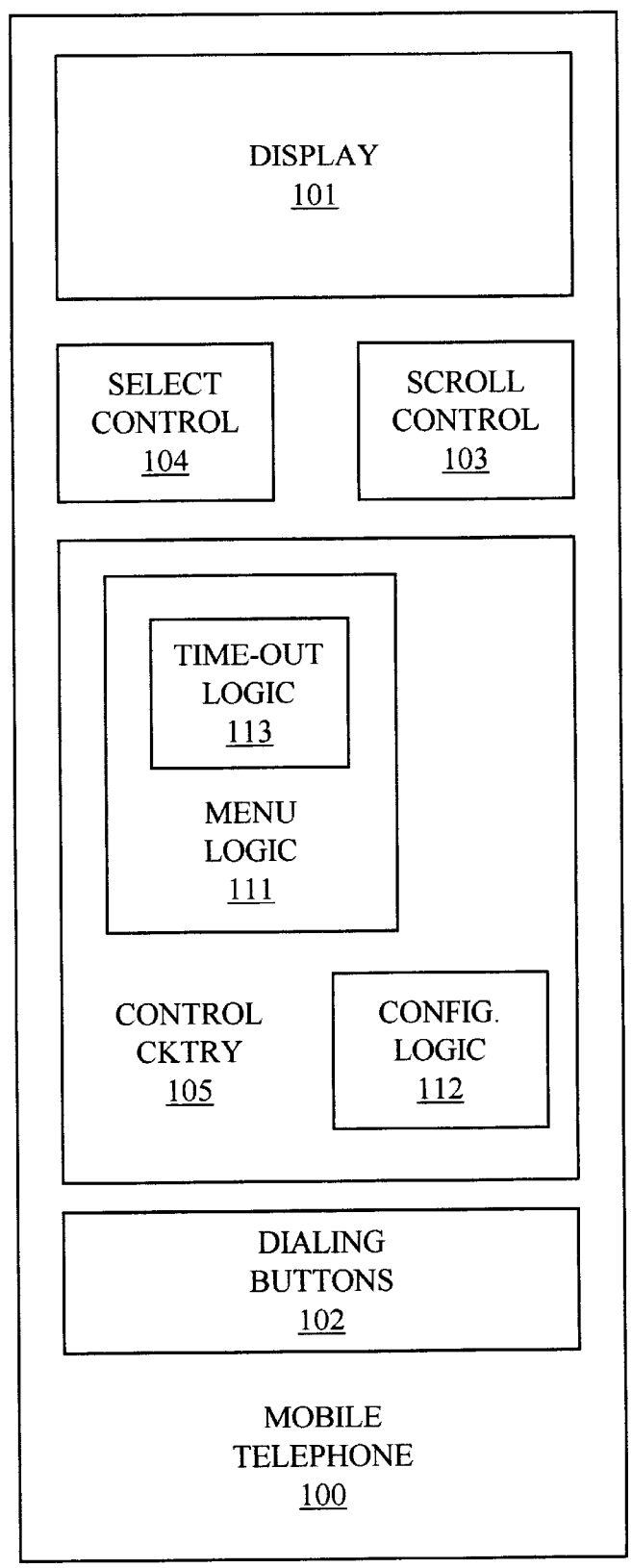
FIG. 1 - PRIOR ART

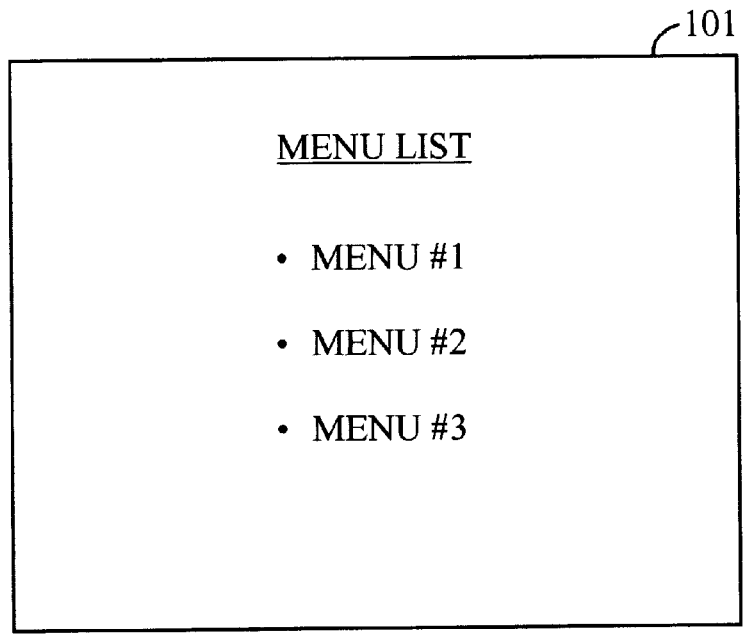
FIG. 2 - PRIOR ART
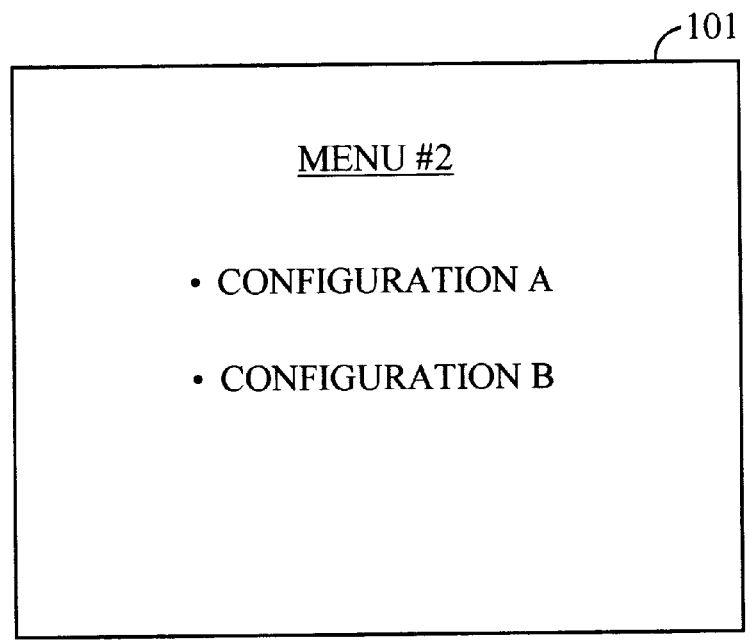
FIG. 3 - PRIOR ART

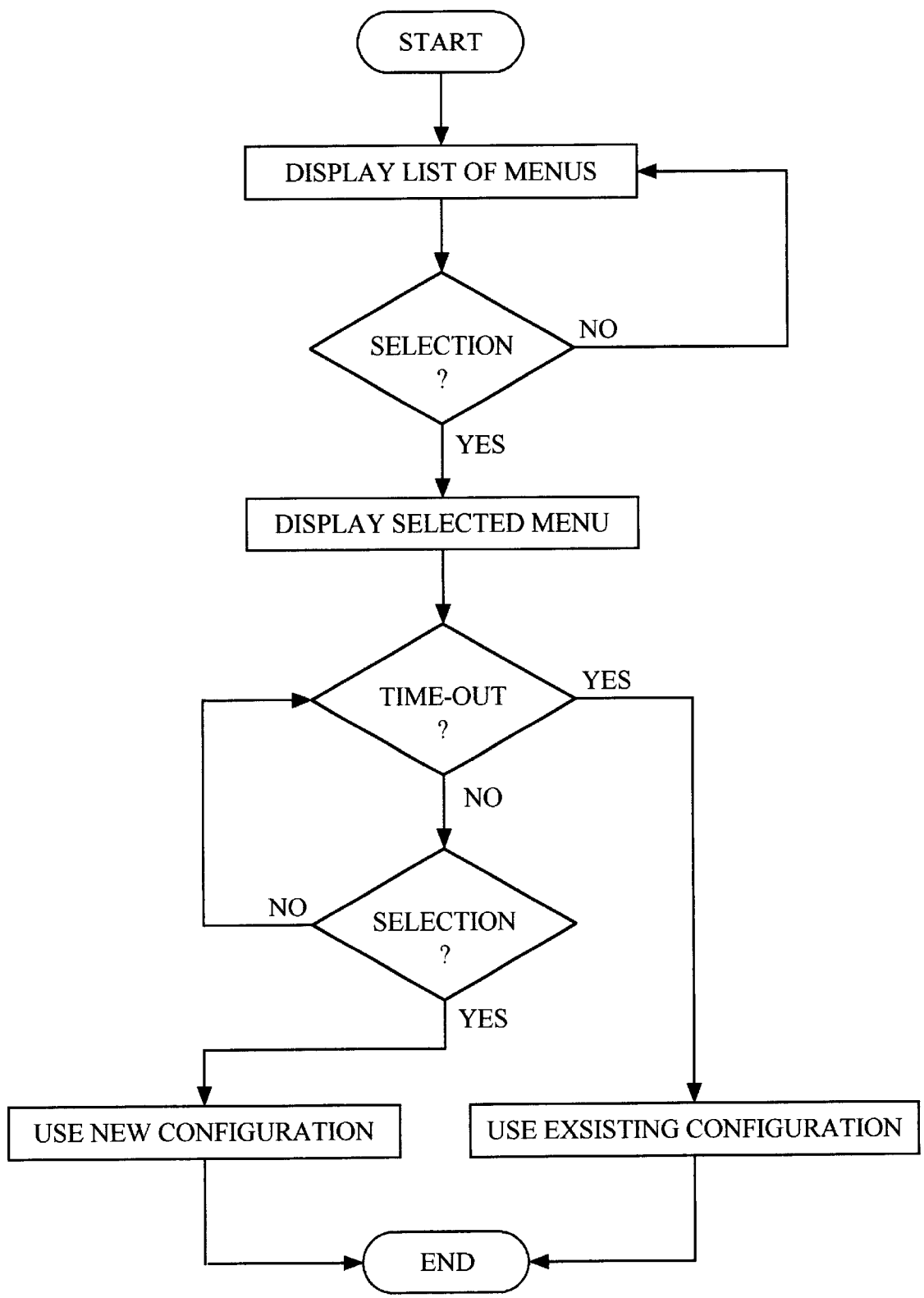
FIG. 4 - PRIOR ART

MENU LIST

- MENU #1
- MENU #2
- MENU #3

MENU #2

- CONFIGURATION A
- CONFIGURATION B

| MENU | CONFIG. |
|---|---|
| #1 | EXISTING |
| #2 | X |
| #3 | Y |
| #4 | Z |
| SERVICE PROVIDER SELECTION MODE | AUTOMATIC |

FIG. 9

MOBILE TELEPHONE CONFIGURATION IN RESPONSE TO A MENU TIME-OUT

BACKGROUND OF THE INVENTION

I. Field of the Invention

The present invention relates to the field of mobile telephones. More particularly, the present invention relates to a novel and improved mobile telephone that automatically and intelligently implements a new configuration after a menu time-out.

II. Description of the Related Art

FIGS. 1–4 illustrate the configuration and operation of a mobile telephone in the prior art. FIG. 1 is a block diagram that depicts a conventional mobile telephone 100. The mobile telephone 100 includes display 101, dialing buttons 102, menu scroll control 103, menu select control 104, and control circuitry 105. The control circuitry 105 includes menu logic 111 and configuration logic 112. The menu logic 111 includes time-out logic 113. Those skilled in the art will appreciate that FIG. 1 is simplified for clarity, and some conventional components are omitted. Those skilled in the art will also understand that FIG. 1 is a logical view, and that the control circuitry 105 is implemented using processors, memory, software, control lines, and other conventional circuitry.

The display 101 operates in response to control signals from the menu logic 111. The menu logic 111 operates in response to control signals from the menu scroll control 103 and the menu select control 104. The configuration logic 112 controls the configuration of the mobile telephone 100 in response to menu selections. The time-out logic 113 tracks the elapsed time after a menu is entered and indicates when the elapsed time exceeds a time period. In response to a time-out, the menu logic 111 reverts to a default menu, and the configuration logic 112 continues to use the existing configuration.

FIG. 2 depicts the display 101 displaying a menu list. The menu list includes menu #1, menu #2, and menu #3. The scroll control 103 is used to hi-light one of the menus, and the selection control 104 is used to select the hi-lighted menu. For example, the scroll control 103 could be used to hi-light menu #2, and the selection control 104 could be used to select menu #2.

FIG. 3 depicts the display 101 displaying menu #2 in response to the selection. Menu #2 includes configuration A and configuration B. The scroll control 103 is used to hi-light one of the configurations, and the selection control 104 is used to select the hi-lighted configuration. For example, the scroll control 103 could be used to hi-light configuration B, and the selection control 104 could be used to select configuration B. The configuration logic 112 would then implement configuration B in response to the menu selection.

One example of a menu is a Service Provider Selection Mode menu. Some examples of configurations on the Service Provider Selection Mode menu include manual mode and automatic mode. In manual mode, the user manually selects the service provider to use. In automatic mode, the mobile telephone 100 automatically selects the service provider to use.

FIG. 4 depicts the operation of the control circuitry 105. The menu logic 111 puts a list of menus on the display 101. If the user selects one of the displayed menus, then the menu logic 111 puts the selected menu on the display. The selected menu includes a list of configurations. If the user selects one of the configurations before a time-out occurs, then the configuration logic 112 implements the new configuration. If the time-out logic 113 times-out before a new configuration is selected, then the configuration logic 112 continues to use the existing configuration. Unfortunately, the configuration logic 112 does not intelligently implement a new configuration in response to the time-out from the menu.

SUMMARY OF THE INVENTION

The present invention includes a novel and improved mobile telephone that implements a new configuration in response to a time-out from a menu. Advantageously, the mobile telephone can be configured to intelligently implement new configurations instead of merely reverting to the existing configuration.

A mobile telephone has an existing configuration and displays a menu. The mobile telephone generates a time-out from the menu if the elapsed time after entering the menu exceeds a time period. In response to the time-out, the mobile telephone implements a new configuration based on the menu in which the time-out occurred.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 is a block diagram of a mobile telephone in the prior art;

FIG. 2 is an illustration of a screen display for the mobile telephone in the prior art;

FIG. 3 is an illustration of a screen display for the mobile telephone in the prior art;

FIG. 4 is flow diagram depicting the operation of the mobile telephone in the prior art;

FIG. 6 is an illustration of a screen display for the mobile telephone in an example of the invention;

FIG. 7 is an illustration of a screen display for the mobile telephone in an example of the invention;

FIG. 9 is table diagram depicting the logic in the mobile telephone in an example of the invention.

DETAILED DESCRIPTION OF THE PREFERRED EMBODIMENTS

Figure 5:
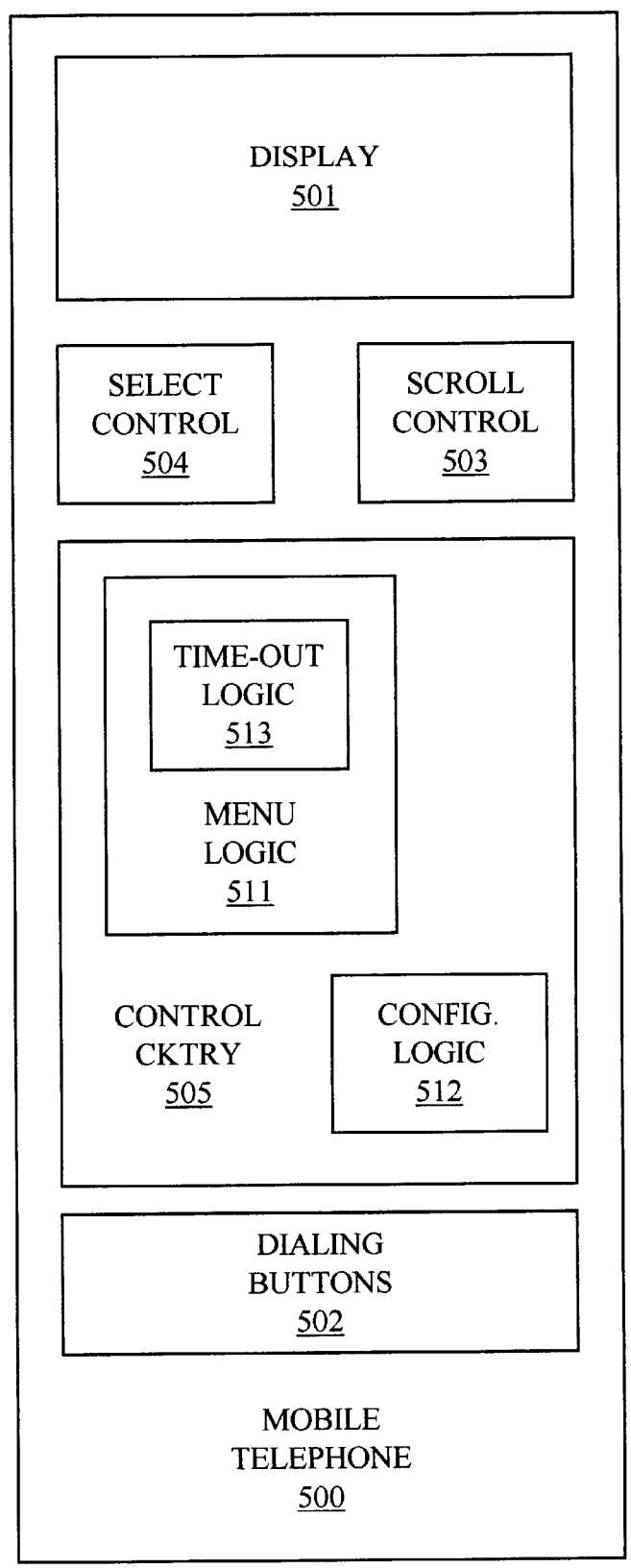
FIG. 5 is a block diagram of a mobile telephone in an example of the invention.

FIGS. 5–9 illustrate the configuration and operation of a mobile telephone in an example of the invention. FIG. 5 is a block diagram that depicts a mobile telephone 500. The mobile telephone 500 includes display 501, dialing buttons 502, menu scroll control 503, menu select control 504, and control circuitry 505. The control circuitry 505 includes menu logic 511 and configuration logic 512. The menu logic 511 includes time-out logic 513. Those skilled in the art will appreciate that FIG. 5 is simplified for clarity, and some conventional components are omitted. Those skilled in the art will also understand that FIG. 5 is a logical view, and that the control circuitry 505 is implemented using processors, memory, software, control lines, and other circuitry.

The display 501 operates in response to control signals from the menu logic 511. The menu logic 511 operates in response to control signals from the menu scroll control 503 and the menu select control 504. The configuration logic 512 controls the configuration of the mobile telephone 500 in response to menu selections. The time-out logic 513 tracks the elapsed time after a menu is entered and indicates when the elapsed time exceeds a time period. In response to a time-out, the menu logic 511 reverts to a default menu, and the configuration logic 112 either continues to use its existing configuration or implements a new configuration based on the menu in which the time-out occurred.

FIG. 6 depicts the display 501 displaying a menu list. The menu list includes menu #1, menu #2, and menu #3. The scroll control 503 is used to hi-light one of the menus, and the selection control 504 is used to select the hi-lighted menu. For example, the scroll control 503 could be used to hi-light menu #2, and the selection control 504 could be used to select menu #2. Alternatively, one or more of dialing buttons 502 could be used to hi-light one of the menus and select the hi-lighted menu.

FIG. 7 depicts the display 501 displaying menu #2 in response to the selection. Menu #2 includes configuration A and configuration B. The scroll control 503 is used to hi-light one of the configurations, and the selection control 504 is used to select the hi-lighted configuration. For example, the scroll control 503 could be used to hi-light configuration B, and the selection control 504 could be used to select configuration B. The configuration logic 512 would then implement configuration B in response to the menu selection.

One example of menu #2 is a Service Provider Selection Mode menu. Some examples of configurations on the Service Provider Selection Mode menu include manual mode and automatic mode. In manual mode, the user manually selects the service provider to use. In automatic mode, the mobile telephone 500 automatically selects the service provider to use.

Figure 8:
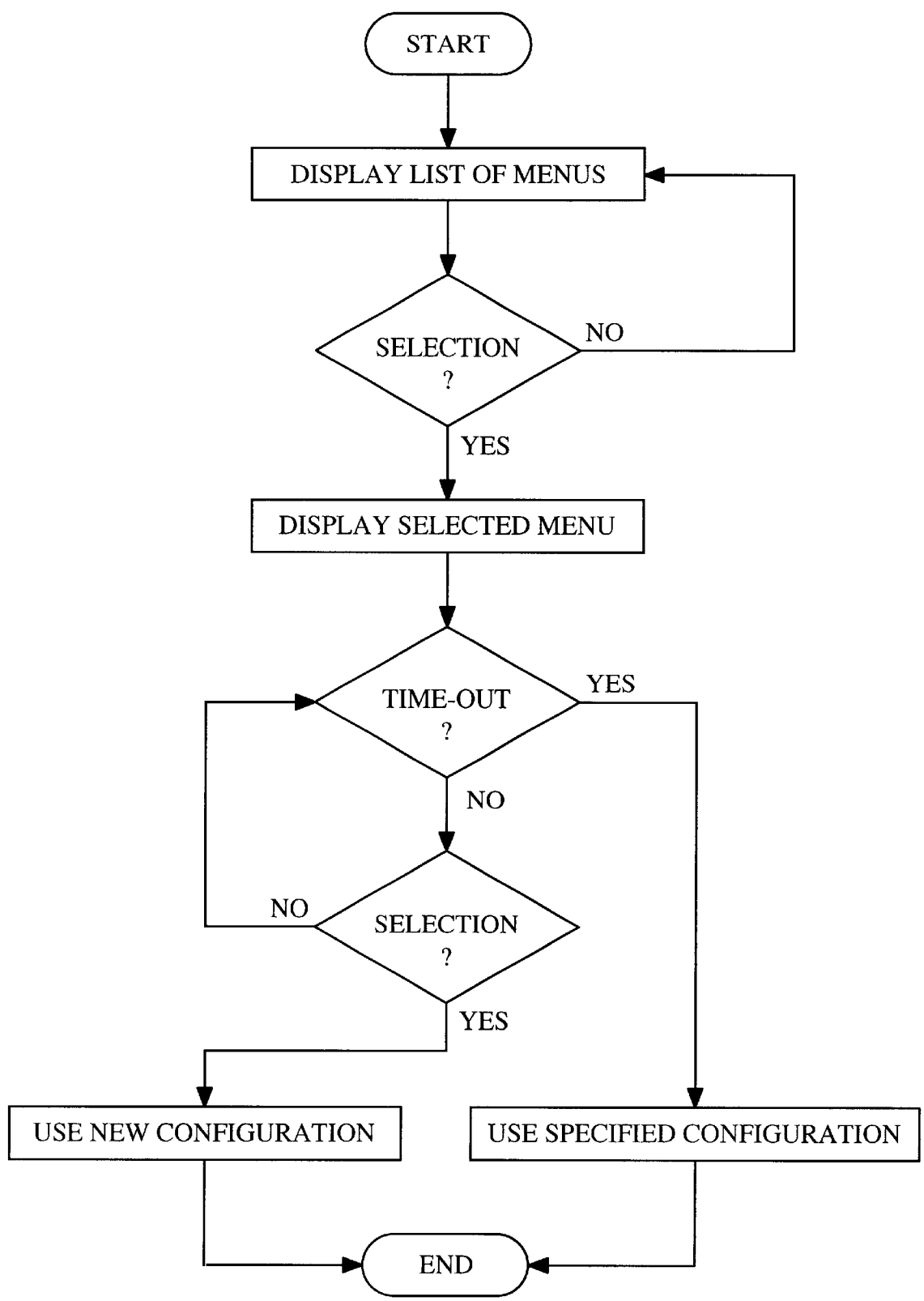
FIG. 8 is flow diagram depicting the operation of the mobile telephone in an example of the invention.

FIG. 8 depicts the operation of the control circuitry 505. The menu logic 511 puts a list of menus on the display 501. If the user selects one of the displayed menus, then the menu logic 511 puts the selected menu on the display. The selected menu includes a list of configurations. If the user selects one of the configurations before a time-out occurs, then the configuration logic 512 implements the new configuration. If the time-out logic 513 times-out before a new configuration is selected, then the configuration logic 512 implements the specified configuration for a time-out from that menu. The specified configuration could be either the existing configuration or a new configuration intelligently selected for the given menu time-out.

FIG. 9 depicts an example of a logical table used by the configuration logic 512 after a time-out. The left column is a list of menus and the right column is a corresponding list of configurations. After a time-out, the configuration logic 512 enters the left column using the menu in which the time-out occurred, and implements the corresponding configuration in the right column.

In some embodiments of the invention, the list of menus includes the Service Provider Selection Mode menu, and the corresponding configuration is the automatic mode. If the mobile telephone 500 is in manual mode for service provider selection when a time-out occurs in the Service Provider Selection Mode menu, then the configuration logic 512 automatically implements the automatic mode.

In some embodiments of the invention, the mobile telephone of the present invention is configured to communicate with satellites systems and in other embodiments the mobile telephone of the present invention is configured to communicate with terrestrial systems.

Some satellite systems use code division multiple access (CDMA) spread spectrum signals as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

Related commonly owned applications also incorporated herein by reference are application Ser. No. 08/723,722, entitled "Position Determination Using One Low-Earth Orbit Satellite," application Ser. No. 08/723,722, entitled "Passive Position Determination Using Two Low-Earth Orbit Satellite," application Ser. No. 08/723,725, entitled "Unambiguous Position Determination Using Two Low-Earth Orbit Satellites," and application Ser. No. 08/723,723 entitled "Ambiguity Resolution for Ambiguous Position Solutions Using Satellite Beams."

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a mobile telephone having an existing configuration, the method comprising:
   displaying a menu having a plurality of configuration options;
   generating a time-out from the menu if an elapsed time after entering the menu exceeds a time period; and
   in response to the time-out, automatically implementing a new configuration option from said plurality of configuration options based on the menu in which the time-out occurred and automatically altering the mode of operation of the mobile telephone to correspond to said new configuration option.

2. The method of claim 1 wherein displaying the menu comprises displaying a Service Provider Selection Mode menu.

3. The method of claim 2 wherein the existing configuration comprises a manual mode and wherein implementing the new configuration comprises implementing an automatic mode.

4. The method of claim 1 further comprising displaying a list of menus, and wherein displaying the menu comprises displaying the menu in response to a selection from the list of menus.

5. The method of claim 1 wherein the mobile telephone is configured to communicate with satellites.

6. The method of claim 5 wherein the mobile telephone is configured to communicate using code division multiple access spread spectrum signaling.

7. A mobile telephone having an existing configuration, the mobile telephone comprising:
   menu logic configured to control a display to display a menu having a plurality of configuration options;
   time-out logic configured to generate a time-out if an elapsed time after entering the menu exceeds a time period; and configuration logic configured to automatically implement a new configuration option from said plurality of configuration options in response to the time-out and based on the menu in which the time-out occurred and to automatically alter the mode of operation of the mobile telephone to correspond to said new configuration option.

8. The mobile telephone of claim 7 wherein the menu comprises a Service Provider Selection Mode menu.

9. The mobile telephone of claim 8 wherein the existing configuration comprises a manual mode and wherein the new configuration comprises an automatic mode.

10. The mobile telephone of claim 7 wherein the menu logic is configured to control the display to display a list of menus, and to control the display to display the menu in response to a selection from the list of menus.

11. The mobile telephone of claim 7 wherein the mobile telephone is configured to communicate with satellites.

12. The mobile telephone of claim 11 wherein the mobile telephone is configured to communicate using code division multiple access spread spectrum signaling.

* * * * *